United States Patent
Wang et al.

(10) Patent No.: US 10,604,646 B2
(45) Date of Patent: Mar. 31, 2020

(54) THERMOPLASTIC COMPOSITIONS FOR ELECTRONICS OR TELECOMMUNICATION APPLICATIONS AND SHAPED ARTICLE THEREFORE

(71) Applicant: SABIC Global Technologies B.V., Bergen op Zoom (NL)

(72) Inventors: Jian Wang, Shanghai (CN); Shijie Song, Shanghai (CN); Zhenke Wei, Shanghai (CN); Qin Wang, Shanghai (CN); Mian Dai, Shanghai (CN)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/300,991

(22) PCT Filed: May 25, 2017

(86) PCT No.: PCT/IB2017/053093
§ 371 (c)(1),
(2) Date: Nov. 13, 2018

(87) PCT Pub. No.: WO2017/203467
PCT Pub. Date: Nov. 30, 2017

(65) Prior Publication Data
US 2019/0177519 A1   Jun. 13, 2019

Related U.S. Application Data

(60) Provisional application No. 62/341,847, filed on May 26, 2016.

(51) Int. Cl.
| | | |
|---|---|---|
| C08K 7/14 | (2006.01) | |
| C08L 23/12 | (2006.01) | |
| C08L 23/08 | (2006.01) | |
| C08L 69/00 | (2006.01) | |
| C08L 71/12 | (2006.01) | |
| C08L 67/02 | (2006.01) | |
| C08L 53/02 | (2006.01) | |
| C08L 25/08 | (2006.01) | |

(52) U.S. Cl.
CPC .............. *C08L 23/12* (2013.01); *C08K 7/14* (2013.01); *C08L 23/0869* (2013.01); *C08L 23/0884* (2013.01); *C08L 25/08* (2013.01); *C08L 53/025* (2013.01); *C08L 67/02* (2013.01); *C08L 67/025* (2013.01); *C08L 69/00* (2013.01); *C08L 71/12* (2013.01); *C08L 2203/30* (2013.01)

(58) Field of Classification Search
CPC ........ C08L 23/12; C08L 25/08; C08L 53/025; C08L 67/02; C08L 69/00; C08L 23/0869; C08L 23/0884; C08L 67/025; C08L 71/12; C08K 7/14
USPC ........................................................ 523/206
See application file for complete search history.

(56) References Cited

U.S. PATENT DOCUMENTS

| | | | | |
|---|---|---|---|---|
| 6,420,476 | B1 * | 7/2002 | Yamada | H01B 3/442 524/575 |
| 2009/0255714 | A1 | 10/2009 | Sohn et al. | |
| 2012/0060678 | A1 * | 3/2012 | Peters | B29C 70/06 89/36.02 |
| 2013/0345347 | A1 * | 12/2013 | Steendam | C08L 69/00 524/151 |
| 2015/0368458 | A1 | 12/2015 | Sun et al. | |
| 2017/0029615 | A1 * | 2/2017 | He | C08L 67/00 |

FOREIGN PATENT DOCUMENTS

| | | |
|---|---|---|
| EP | 0633295 B1 | 2/2002 |
| JP | 2015040296 A | 3/2015 |
| WO | 20150200272 A2 | 12/2015 |

OTHER PUBLICATIONS

Li H, Eng; Tang C; Westbrook P: "Low Dielectric glass fibre development—new printed circuit board base materials"; Glass Technology; European Journal of Glass Science and Technology Part A, vol. 54, No. 2, Apr. 1, 2013 (Apr. 1, 2013), pp. 81-85.
International Patent Application No. PCT/IB2017/053093; Int'l Search Report and the Written Opinion; dated Aug. 17, 2017; 12 pages.
International Patent Application No. PCT/IB2017/053093; Int'l Preliminary Report on Patentability; dated Sep. 7, 2018; 6 pages.

* cited by examiner

*Primary Examiner* — Hannah J Pak
(74) *Attorney, Agent, or Firm* — BakerHostetler

(57) ABSTRACT

A thermoplastic composition includes from about 50 wt. % to about 90 wt. % of a polymeric base resin and from about 10 wt. % to about 50 wt. % of a low dielectric constant (Dk)/low dissipation factor (Df) glass fiber component. The low Dk/low Df glass fiber component has a Dk of less than about 5.0 at a frequency of from 1 MHz to 1 GHz and a Df of less than about 0.002 at a frequency of from 1 MHz to 1 GHz. In certain aspects the thermoplastic composition has a Dk that is at least about 0.1 lower than a substantially identical reference composition that does not include the low Dk/low Df glass fiber component.

16 Claims, No Drawings

THERMOPLASTIC COMPOSITIONS FOR ELECTRONICS OR TELECOMMUNICATION APPLICATIONS AND SHAPED ARTICLE THEREFORE

CROSS-REFERENCE TO RELATED APPLICATION

This application is the National Stage of International Application No. PCT/IB2017/053093, filed May 25, 2017, which claims the benefit of U.S. Provisional Application No. 62/341,847 filed May 26, 2016, the disclosures of which are incorporated herein by this reference in their entireties.

FIELD OF THE DISCLOSURE

The present disclosure relates to thermoplastic compositions for use in telecommunications applications, and in particular to thermoplastic compositions having a relatively low dielectric constant and dissipation factor.

BACKGROUND OF THE DISCLOSURE

Plastics have been widely used in electronics and telecommunication applications to make structural or function components of antennas, radio-frequency (RF) components, and other related devices. Successive generations of mobile communications networks have utilized successively higher working frequencies. The next generation of mobile networks (e.g., 5G, or $5^{th}$ generation mobile networks) are expected to utilize frequencies in the 10-100 gigahertz (GHz) range, which is much higher than current 3G and 4G networks operating in the 2-3 GHz range. In these high RF environments, the electro-magnetic (EM) waves generated by telecommunication antennas will receive much more interference by surrounding materials such as plastics and metals. In addition, plastics made from polymers are dielectric substances, which can temporarily store EM energy. Polymeric materials with a higher dielectric constant (Dk) and dissipation factor (Df) will absorb substantially more EM energy, affecting the strength and phase of the EM wave and decreasing antenna performance. Dielectric performance is thus one consideration in selecting materials for RF components.

In addition to dielectric performance, however, plastics for use in RF components should also have certain mechanical performance characteristics including high modulus, low coefficient of thermal expansion (CTE), and high impact strength. Improved mechanical performance may be imparted to polymeric materials by the addition of fillers such as glass fiber, carbon fiber and ceramics. However, common fillers in use today result in elevated dielectric performance (Dk and Df) properties.

These and other shortcomings are addressed by aspects of the present disclosure.

SUMMARY

Aspects of the disclosure relate to a thermoplastic composition including from 50 weight percent (wt. %) to 90 wt. % or from about 50 wt. % to about 90 wt. % of a polymeric base resin and from 10 wt. % to 50 wt. % or from about 10 wt. % to about 50 wt. % of a low dielectric constant (Dk)/low dissipation factor (DO glass fiber component. In some aspects the low Dk/low Df glass fiber component has a Dk of less than 5.0 at 1 megahertz (MHz) or less than about 5.0 at a frequency of from 1 MHz to 1 GHz and a Df of less than 0.002 or less than about 0.002 at a frequency of from 1 MHz to 1 GHz.

Aspects of the disclosure further relate to methods for making a thermoplastic article, including: forming a blend by mixing from 50 wt. % to 90 wt. %, or from about 50 wt. % to about 90 wt. % of a polymeric base resin and from about 10 wt. % to about 50 wt. % of a low dielectric constant (Dk)/low dissipation factor (DO glass fiber component; and injection molding, extruding, rotational molding, blow molding or thermoforming the blend to form the thermoplastic article. In certain aspects the low Dk/low Df glass fiber component has a Dk of less than about 5.0 at a frequency of from 1 MHz to 1 GHz and a Df of less than about 0.002 at a frequency of from 1 MHz to 1 GHz.

DETAILED DESCRIPTION

The present disclosure can be understood more readily by reference to the following detailed description of the disclosure and the Examples included therein. In various aspects, the present disclosure pertains to thermoplastic compositions including from about 50 wt. % to about 90 wt. % of a polymeric base resin and from about 10 wt. % to about 50 wt. % of a low dielectric constant (Dk)/low dissipation factor (DO glass fiber component. The low Dk/low Df glass fiber component has a Dk of less than about 5.0 at a frequency of from 1 MHz to 1 GHz and a Df of less than about 0.002 at a frequency of from 1 MHz to 1 GHz. In an aspect, the thermoplastic compositions exhibit improved dielectric properties.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonate polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additive materials" means that the additive material can or cannot be included.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein the terms "weight percent," "wt %," and "wt. %," which can be used interchangeably, indicate the percent by weight of a given component based on the total weight of the composition, unless otherwise specified. That is, unless otherwise specified, all wt. % values are based on the total weight of the composition. It should be understood that the sum of wt. % values for all components in a disclosed composition or formulation are equal to 100.

Certain abbreviations are defined as follows: "g" is grams, "kg" is kilograms, "° C." is degrees Celsius, "min" is minutes, "mm" is millimeter, "mPa" is megapascal, "WiFi" is a system of accessing the internet from remote machines, "GPS" is Global Positioning System—a global system of U.S. navigational satellites which provide positional and velocity data. "LED" is light-emitting diode, "RF" is radio frequency, and "RFID" is radio frequency identification.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Thus, in various aspects, the present disclosure pertains to a thermoplastic composition including from 50 wt. % to 90 wt. % (or from about 50 wt. % to about 90 wt. %) of a polymeric base resin and from 10 wt. % to 50 wt. % (or from about 10 wt. % to about 50 wt. %) of a low dielectric constant (Dk)/low dissipation factor (Df) glass fiber component. The low Dk/low Df glass fiber component has a Dk of less than 5 or less than about 5.0 at a frequency of from 1 MHz to 1 GHz and a Df of less than 0.002 or less than about 0.002 at a frequency of from 1 MHz to 1 GHz.

Polymeric Base Resin

In some aspects the polymeric base resin includes, but is not limited to polypropylene (PP), poly(p-phenylene oxide) (PPO), polystyrene (PS), polycarbonate (PC), polybutylene terephthalate (PBT), polyethylene terephthalate (PET), polyamide (PA) or a combination thereof.

As used herein, polypropylene can be used interchangeably with poly(propene).

As used herein, poly(p-phenylene oxide) can be used interchangeably with poly(p-phenylene ether) or poly (2,6 dimethyl-p-phenylene oxide). Poly(p-phenylene oxide) may be included by itself or may be blended with other polymers, including but not limited to polystyrene, high impact styrene-butadiene copolymer and/or polyamide.

As used herein, polystyrene can be used interchangeably with poly (2,6 dimethyl-p-phenylene oxide). A syndiotactic polystyrene may refer to a polystyrene having alternating stereochemical configurations. Polystyrene is a type of high temperature crystalline polymeric plastics and is often used in electronic devices.

As used herein, polycarbonate refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

As used herein, polybutylene terephthalate can be used interchangeably with poly(1,4-butylene terephthalate). Polybutylene terephthalate is one type of polyester. Polyesters, which include poly(alkylene decarboxylases), liquid crystalline polyesters, and polyester copolymers, can be useful in the disclosed thermoplastic compositions of the present disclosure.

As used herein, polyethylene terephthalate can be used interchangeably with poly(ethyl benzene-1,4-dicarboxylate). As with polybutylene terephthalate, polyethylene terephthalate is a type of polyester.

As used herein, a polyamide is a polymer having repeating units linked by amide bonds, and can include aliphatic polyamides (PA) (e.g., the various forms of nylon such as nylon 6 (PA6), nylon 66 (PA66) and nylon 9 (PA9)), polyphthalamides (e.g., PPA/high performance polyamide) and aramids (e.g., para-aramid and meta-aramid).

The polymeric base resin is not limited to those described herein. Thus, in some aspects the polymeric base resin may include polymers in addition to or in the alternative to those described above, including but not limited to polyetherimide (PEI), polyaryletherketone (PAEK), more specifically a polyether ether ketone (PEEK), and combinations thereof.

As used herein, a polyetherimide refers to a polymer with repeating $C_{37}H_{24}O_6N_2$ units. Polyetherimides represent amorphous polymeric plastics.

As used herein, polyphenylene sulfide (PPS) may refer to a polymer including repeating p-substituted benzene rings and sulfur atoms.

In certain aspects the thermoplastic composition includes from about 50 wt. % to about 90 wt. % of the polymeric base resin. In further aspects the thermoplastic composition includes from 60 wt. % to 80 wt. % (or from about 60 wt. % to about 80 wt. %) of the polymeric base resin.

Glass Fiber Component

The disclosed thermoplastic compositions include from about 10 wt. % to about 50 wt. % of a low dielectric constant (Dk)/low dissipation factor (Df) glass fiber component. In certain aspects the glass fiber in the glass fiber component is selected from E-glass, S-glass, AR-glass, T-glass, D-glass and R-glass. In a still further aspect, the glass fiber is selected from E-glass, S-glass, and combinations thereof. In a still further aspect, the glass fiber component includes one or more E-glass materials. The glass fibers can be made by standard processes, e.g., by steam or air blowing, flame blowing, and mechanical pulling. Exemplary glass fibers for thermoplastic compositions of the present disclosure may be made by mechanical pulling.

The glass fibers may be sized or unsized. Sized glass fibers are coated on their surfaces with a sizing composition selected for compatibility with the polymeric base resin. The sizing composition facilitates wet-out and wet-through of the polymeric base resin upon the fiber strands and assists in attaining desired physical properties in the thermoplastic composition.

In various further aspects, the glass fiber is sized with a coating agent. In a further aspect, the coating agent is present in an amount from 0.1 wt. % to 5 wt. % (or from about 0.1 wt. % to about 5 wt. %) based on the weight of the glass fibers. In a still further aspect, the coating agent is present in an amount from 0.1 wt. % to 2 wt. % (or from about 0.1 wt. % to about 2 wt. %) based on the weight of the glass fibers.

In preparing the glass fibers, a number of filaments can be formed simultaneously, sized with the coating agent and then bundled into what is called a strand. Alternatively the strand itself may be first formed of filaments and then sized. The amount of sizing employed is generally that amount which is sufficient to bind the glass filaments into a continuous strand and ranges from 0.1 wt. % to 5 wt. % or from about 0.1 to about 5 wt. %, 0.1 wt. % to 2 wt. % or about 0.1 wt. % to about 2 wt. % based on the weight of the glass fibers. Generally, this may be about 1.0 wt. % based on the weight of the glass filament.

In a further aspect, the glass fiber can be continuous or chopped. In a still further aspect, the glass fiber is continuous. In yet a further aspect, the glass fiber is chopped. Glass fibers in the form of chopped strands may have a length of 0.3 millimeter (mm) to 10 centimeters (cm) or from about 0.3 mm to about 10 cm, specifically 0.5 mm to 5 cm or from about 0.5 millimeter to about 5 centimeters, and more specifically 1.0 mm to 2.5 cm or from about 1.0 millimeter to about 2.5 centimeters. In various further aspects, the glass fiber has a length from 0.2 mm to 20 mm or from about 0.2 mm to about 20 mm. In a yet further aspect, the glass fiber has a length from 0.2 mm to 10 mm or from about 0.2 mm to about 10 mm. In an even further aspect, the glass fiber has a length from 0.7 mm to 7 mm or from about 0.7 mm to about 7 mm. In this area, where a thermoplastic resin is reinforced with glass fibers in a composite form, fibers having a length of 0.4 mm or about 0.4 mm are generally referred to as long fibers, and shorter ones are referred to as short fibers. In a still further aspect, the glass fiber can have a length of 1 mm or longer. In yet a further aspect, the glass fiber can have a length of 2 mm or longer.

In various further aspects, the glass fiber has a round (or circular), flat, or irregular cross-section. Thus, use of non-round fiber cross sections is possible. In a still further aspect, the glass fiber has a circular cross-section. In yet further aspect, the diameter of the glass fiber is 1 micrometer (micron, μm) to 20 μm or from about 1 to about 20 μm. In an even further aspect, the diameter of the glass fiber is from 4 μm to 15 μm or from about 4 μm to about 15 μm. In a still further aspect, the diameter of the glass fiber is from 1 μm to 15 μm or from about 1 to about 15 μm. In a still further aspect, the glass fiber has a diameter from 7 μm to 15 μm or from about 7 μm to about 15 μm.

As noted, in some aspects, the thermoplastic composition includes from 10 wt. % to 50 wt. % (or from about 10 wt. % to about 50 wt. %) of the glass fiber component. In further aspects, the thermoplastic composition includes from 15 wt. % to 40 wt. % (or from about 15 wt. % to about 40 wt. %) of the glass fiber component, or from 20 wt % to 35 wt. % (or from about 20 wt. % to about 35 wt. %) of the glass fiber component, or from 20 wt. % to 30 wt. % (or from about 20 wt. % to about 30 wt. %) of the glass fiber component.

In certain aspects of the disclosure the glass fiber used in the glass fiber component has a Dk of less than 5.0 at a frequency of from 1 MHz to 1 GHz and a Df of less than 0.002 at a frequency of from 1 MHz to 1 GHz. In a further aspect the glass fiber has a Df of less than 0.0001 at a frequency of 1 MHz to 1 GHz.

Exemplary glass fibers suitable for use in an aspect of the disclosure include, but are not limited to, the E-glass fibers ECS(HL)303 and/or CS(HL)301HP, available from Chongqing Polycomp International Corp. (CPIC). This fiber has a Dk of 4.6 at 1 MHz and a Df of less than 0.001 at 1 MHz, each when tested in accordance with IEC 60250-1969.

Impact Modifier Component

Thermoplastic compositions according to aspects of the present disclosure may include an impact modifier component. In an aspect, suitable impact modifiers can include an epoxy-functional block copolymer. The epoxy-functional block copolymer can include units derived from a $C_{2-20}$ olefin and units derived from a glycidyl (meth)acrylate. Exemplary olefins include ethylene, propylene, butylene, and the like. The olefin units can be present in the copolymer in the form of blocks, e.g., as polyethylene, polypropylene, polybutylene, and the like blocks. It is also possible to use mixtures of olefins, i.e., blocks containing a mixture of ethylene and propylene units, or blocks of polyethylene together with blocks of polypropylene. In further aspects, the impact modifier may include a copolymer including olefins such as those described above and other units such as styrene.

In addition to glycidyl (meth)acrylate units, the epoxy-functional block copolymers can further include additional units, for example $C_{1-4}$ alkyl (meth)acrylate units. In one aspect, the impact modifier is terpolymeric, including polyethylene blocks, methyl acrylate blocks, and glycidyl methacrylate blocks. Specific impact modifiers are a co- or terpolymer including units of ethylene, glycidyl methacrylate (GMA), and methyl acrylate. It will be recognized that combinations of impact modifiers may be used.

Exemplary but by no means limiting impact modifiers for use in thermoplastic compositions of aspects of the present disclosure include: G1652, which is a styrene and ethylene/butylene (SEBS) copolymer available from Kraton™; Tuftec™ H1043, a styrene and ethylene/butylene (SEBS) copolymer available from Asahi Kasei; and a combination of polyester elastomer impact modifiers, such as Hytrel™ 4056, a butylene phthalate-poly(alkylene ether) phthalate copolymer available from DuPont, Amplify™ EA 102, an acrylic acid ethyl ester-ethylene copolymer available from Dow, and Lotader™ AX 8900, an ethylene-methyl acrylate-glycidylmethacrylate terpolymer available from Arkema; and combinations thereof.

In some aspects, the impact modifier may be present in an amount from greater than 0 wt. % to 20 wt. % or to about 20 wt %. In further aspects, the impact modifier is present in an amount from 0.01 wt. % or about 0.01 wt. % to 15 wt. % or to about 15 wt %, or from about 5 wt. % to about 15 wt % or from 5 wt. % to 15 wt. %, or from 5 wt. % to 10 wt. % or from about 5 wt. % to about 10 wt %.

Optional Polymer Composition Additives

In addition to the foregoing components, the disclosed thermoplastic compositions can optionally include a balance amount of one or more additive materials ordinarily incorporated in thermoplastic compositions of this type, with the proviso that the additives are selected so as to not significantly adversely affect the desired properties of the composition. Combinations of additives can be used. Such additives can be mixed at a suitable time during the mixing of the components for forming the composition. Exemplary and non-limiting examples of additive materials that can be present in the disclosed thermoplastic compositions include one or more of a reinforcing filler, enhancer, acid scavenger, anti-drip agent, antioxidant, antistatic agent, chain extender, colorant (e.g., pigment and/or dye), de-molding agent, flow promoter, flow modifier, lubricant, mold release agent, plasticizer, quenching agent, flame retardant (including for example a thermal stabilizer, a hydrolytic stabilizer, or a light stabilizer), ultraviolet (UV) absorbing additive, UV reflecting additive, UV stabilizer and siloxane (which may improve mechanical and/or thermal performance of the composition).

In a further aspect, the disclosed thermoplastic compositions can further include an antioxidant or "stabilizer." Numerous stabilizers are known may be used, in one aspect the stabilizer is a hindered phenol. In some aspects, the stabilizer may be present in an amount from greater than 0 wt. % to 5 wt %, or from greater than 0 wt. % to about 5 wt. %. In further aspects, the stabilizer is present in an amount from 0.01 wt. % to 3 wt. % or from about 0.01 wt. % to about 3 wt %, or from 0.01 wt. % to 2 wt. % or from about 0.01 wt. % to about 2 wt %, or 0.01 wt. % to 1 wt. % or from about 0.01 wt. % to about 1 wt %, or from 0.01 wt. % to 0.05 wt. % or from about 0.01 wt. % to about 0.05 wt %, or from 0.01 wt. % to 0.02 wt. % or from about 0.01 wt. % to about 0.02 wt %.

Properties of Thermoplastic Compositions

The thermoplastic composition according to aspects of the disclosure has good dielectric properties. In certain aspects the thermoplastic composition has a lower Dk and/or a lower Df than an equivalent thermoplastic composition that does not include a low Dk/low Df glass fiber component. In one aspect the thermoplastic composition has a Dk that is at least 0.1 lower, or at least about 0.1 lower, than a substantially identical reference composition in the absence of a low Dk/low Df glass fiber component. In further aspects the thermoplastic composition has a Dk that is at least 0.2 lower, or at least about 0.2 lower, than a substantially identical reference composition in the absence of a low Dk/low Df glass fiber component, or the thermoplastic composition has a Dk that is at least 0.3 lower, or at least about 0.3 lower, than a substantially identical reference composition in the absence of a low Dk/low Df glass fiber component. As used herein, a "substantially identical reference composition in the absence of a low Dk/low Df glass fiber component" is a thermoplastic composition that has the same components, and the same amounts of the components, as the claimed composition, but includes a conventional glass fiber component (such as the glass fiber component(s) used in the comparative examples herein) instead of a low Dk/low Df glass fiber component.

In a further aspect the thermoplastic composition has a Dk that is at least 3% lower, or about 3% lower, than a substantially identical reference composition in the absence of a low Dk/low Df glass fiber component, or has a Dk that is 3% to 12% lower, or about 3% to about 12% lower, than a substantially identical reference composition in the absence of a low Dk/low Df glass fiber component.

In certain aspects the polymeric base resin includes polypropylene, poly(p-phenylene oxide), polycarbonate, or a combination thereof and the thermoplastic composition has a Df that is at least 5% lower or at least about 5% lower than a substantially identical reference composition in the absence of a low Dk/low Df glass fiber component. In further aspects the polymeric base resin includes polypropylene, poly(p-phenylene oxide), or a combination thereof and the thermoplastic composition has a Df that is at least 30% lower or at least about 30% lower than a substantially identical reference composition in the absence of a low Dk/low Df glass fiber component.

Thermoplastic compositions according to aspects of the disclosure may have improved dielectric properties as discussed above, and may also maintain comparable mechanical performance and processing properties as compositions without the low Dk/low Df glass fiber component. Mechanical and processing properties of interest include, but are not limited to, notched and unnotched Izod impact strength (tested in accordance with ASTM D256), heat deflection temperature (tested in accordance with ASTM D648), flexural modulus and flexural strength (tested in accordance with ASTM D790), tensile modulus/strength/elongation (tested in accordance with ASTM D638), and coefficient of thermal expansion (tested in accordance with ASTM E831).

Thus, the thermoplastic compositions according to aspects of the present disclosure can have much lower Dk and Df values than previously known thermoplastic compositions, but can also maintain satisfactory mechanical performance and processing properties compared to these known compositions. In practice, the dielectric properties of a particular compound or thermoplastic have been found to be difficult to reduce, and thus the reductions in Dk of 0.1 or more such as those found in the thermoplastic compositions of the present disclosure are not only surprising but also highly desirable.

Methods of Manufacture

The thermoplastic compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some aspects the melt processed composition exits processing equipment such as an extruder through small exit holes in a die. The resulting strands of molten resin are cooled by passing the strands through a water bath. The cooled strands can be chopped into small pellets for packaging and further handling.

Compositions can be manufactured by various methods. For example, the components may be first blended in a Henschel-Mixer™ high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming. Compositions were polypropylene (PP), poly(p-phenylene oxide) (PP), polycarbonate (PC), polybutylene terephthalate (PBT), polyethylene terephthalate (PET), and polyamide (PA), polystyrene (PS), polyetherimide (PEI), and polyphenylene sulfide (PPS) based. Compositions were prepared using a Werner-Pfleiderer with barrel and die size in millimeters (mm). Screw speed and side feeder speed in revolutions per minute (RPM); throughput in kilograms per hour (kg/hr); vacuum pressure in megapascals (MPa); back pressure, holding pressure, and maximum injection pressure in kilogram-force per square centimeters (kgf/cm$^2$), cooling time in seconds (s), and injection speed in millimeters per second (mm/s).

Exemplary, but by no means limiting, extrusion and molding profiles for various thermoplastic base materials are listed below in Tables 1A, 1B and 2A, 2B respectively.

TABLE 1A

Typical extrusion profile of compositions

| Parameters | Unit | PP-based | PPO/PP-based | PC-based | PBT/PET-based |
| --- | --- | --- | --- | --- | --- |
| Compounder Type | None | WP | TEM-37BS | TEM-37BS | TEM-37BS |
| Barrel Size | mm | 1025 | 1500 | 1500 | 1500 |
| Die | mm | 3 | 4 | 4 | 4 |
| Zone 1 Temp | ° C. | 20 | 90 | 50 | 100 |
| Zone 2 Temp | ° C. | 40 | 150 | 100 | 200 |
| Zone 3 Temp | ° C. | 150 | 270 | 200 | 240 |
| Zone 4 Temp | ° C. | 210 | 270 | 255 | 240 |
| Zone 5 Temp | ° C. | 210 | 280 | 255 | 240 |
| Zone 6 Temp | ° C. | 210 | 280 | 255 | 250 |
| Zone 7 Temp | ° C. | 210 | 280 | 255 | 250 |
| Zone 8 Temp | ° C. | 210 | 280 | 255 | 250 |
| Zone 9 Temp | ° C. | 210 | 280 | 260 | 250 |
| Zone 10 Temp | ° C. | 210 | 280 | 265 | 250 |
| Zone 11 Temp | ° C. | 210 | 280 | 265 | 250 |
| Die Temp | ° C. | 210 | 270 | 265 | 250 |
| Screw speed | RPM | 350 | 300 | 300 | 200 |
| Throughput | kg/hr | 20 | 35 | 40 | 50 |
| Torque | None | 40-50 | 50-60 | 70-80 | 70-80 |
| Vacuum 1 | MPa | −0.08 | −0.08 | −0.08 | −0.08 |
| Side Feeder 1 speed | RPM | 300 | 250 | 250 | 250 |
| Melt temperature | None | 220 | 275 | 270 | 250 |

TABLE 1B

Typical extrusion profile of compositions

| Parameters | Unit | PA-based | sPS-based | PEI-based | PPS-based |
| --- | --- | --- | --- | --- | --- |
| Compounder Type | None | TEM-37BS | TEM-37BS | WP | WP |
| Barrel Size | mm | 1500 | 1500 | 1025 | 1025 |

TABLE 1B-continued

Typical extrusion profile of compositions

| Parameters | Unit | PA-based | sPS-based | PEI-based | PPS-based |
|---|---|---|---|---|---|
| Die | mm | 4 | 4 | 4 | 4 |
| Zone 1 Temp | °C. | 50 | 50 | 50 | 50 |
| Zone 2 Temp | °C. | 100 | 100 | 150 | 200 |
| Zone 3 Temp | °C. | 310 | 270 | 300 | 300 |
| Zone 4 Temp | °C. | 310 | 280 | 360 | 310 |
| Zone 5 Temp | °C. | 310 | 290 | 360 | 330 |
| Zone 6 Temp | °C. | 300 | 300 | 360 | 330 |
| Zone 7 Temp | °C. | 300 | 300 | 365 | 330 |
| Zone 8 Temp | °C. | 300 | 300 | 365 | 330 |
| Zone 9 Temp | °C. | 300 | 300 | 365 | 330 |
| Zone 10 Temp | °C. | 290 | 300 | 365 | 330 |
| Zone 11 Temp | °C. | 290 | 300 | 365 | 330 |
| Die Temp | °C. | 290 | 300 | 380 | 330 |
| Screw speed | RPM | 300 | 200 | 400 | 400 |
| Throughput | kg/hr | 30 | 50 | 20 | 20 |
| Torque | None | 40-50 | 80~90 | 60-70 | 40-50 |
| Vacuum 1 | MPa | −0.08 | −0.08 | −0.08 | −0.08 |
| Side Feeder 1 speed | RPM | 300 | 250 | >200 | >200 |
| Melt temperature | None | 300 | 294 | 380 | 335 |

TABLE 2A

Typical molding profile of compositions

| Parameters | Unit | PP-based | PPO/PP-based | PC-based | PBT/PET-based |
|---|---|---|---|---|---|
| Cnd: Pre-drying time | Hour | 4 | 3 | 4 | 4 |
| Cnd: Pre-drying temp | °C. | 23 | 100 | 100 | 120 |
| Molding Machine | NA | | FANUC, ES3000 | | |
| Mold Type (insert) | NA | ASTM tensile, flexural, Izod bars, 150 mm × 150 mm × 3.0 mm plaque | | | |
| Hopper temp | °C. | 50 | 50 | 50 | 50 |
| Zone 1 temp | °C. | 200-210 | 270-280 | 280-290 | 240-250 |
| Zone 2 temp | °C. | 200-210 | 280-290 | 290-300 | 250-260 |
| Zone 3 temp | °C. | 200-210 | 280-290 | 290-300 | 250-260 |
| Nozzle temp | °C. | 200-210 | 270-280 | 290-300 | 245-255 |
| Mold temp | °C. | 40-60 | 90-120 | 90-120 | 50-80 |
| Screw speed | RPM | 70 | 100 | 100 | 100 |
| Back pressure | kgf/cm² | 50 | 90 | 50 | 30 |
| Cooling time | s | 15-20 | 15-20 | 15-20 | 20-30 |
| Injection speed | mm/s | 50-100 | 25-100 | 50-150 | 25-100 |
| Holding pressure | kgf/cm² | 600-1000 | 600-1000 | 500-1000 | 500-1000 |
| Max. Injection pressure | kgf/cm² | 800-1200 | 1000-1500 | 800-1200 | 800-1200 |

TABLE 2B

Typical molding profile of compositions

| Parameters | Unit | PA-based | PS-based | PEI-based | PPS-based |
|---|---|---|---|---|---|
| Cnd: Pre-drying time | Hour | 5 | 4 | 4 | 4 |
| Cnd: Pre-drying temp | °C. | 120 | 120 | 150 | 150 |
| Molding Machine | NA | | FANUC, ES3000 | | |
| Mold Type (insert) | NA | ASTM tensile, flexural, Izod bars, 150 mm × 150 mm × 3.0 mm plaque | | | |
| Hopper temp | °C. | 50 | 50 | 50 | 50 |
| Zone 1 temp | °C. | 290-300 | 270~280 | 360-370 | 300-310 |
| Zone 2 temp | °C. | 300-320 | 280~290 | 360-370 | 310-330 |
| Zone 3 temp | °C. | 310-330 | 290~300 | 360-370 | 310-330 |
| Nozzle temp | °C. | 300-320 | 290~300 | 360-370 | 320-330 |
| Mold temp | °C. | 100-150 | 100 | 150 | 130 |
| Screw speed | RPM | 100 | 100 | 90 | 100 |
| Back pressure | kgf/cm² | 40 | 30 | 70 | 30 |
| Cooling time | s | 15-20 | 15~20 | 20 | 20 |
| Injection speed | mm/s | 100-150 | 50 | 50 | 30 |
| Holding pressure | kgf/cm² | 600-1000 | 600-1000 | 600-1000 | 400-800 |
| Max. Injection pressure | kgf/cm² | 800-1500 | 800-1500 | 800-1200 | 600-1200 |

Articles of Manufacture

In one aspect, the present disclosure pertains to shaped, formed, or molded articles comprising the thermoplastic compositions. The thermoplastic compositions can be molded into useful shaped articles by a variety of means such as injection molding, extrusion, rotational molding, blow molding and thermoforming to form articles and structural components of, for example, electronics and telecommunication applications, including but not limited to antennas, radio-frequency (RF) components, and other related devices. In a further aspect, the article is extrusion molded. In a still further aspect, the article is injection molded.

In a further aspect, the resulting disclosed compositions can be used to provide any desired shaped, formed, or molded articles. For example, the disclosed compositions can be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed thermoplastic compositions can be used to form articles such as antennas, radio-frequency (RF) components, and other related devices.

Various combinations of elements of this disclosure are encompassed by this disclosure, e.g., combinations of elements from dependent claims that depend upon the same independent claim.

Aspects Of The Disclosure

In various aspects, the present disclosure pertains to and includes at least the following aspects.

Aspect 1: A thermoplastic composition comprising: from about 50 wt. % to about 90 wt. % of a polymeric base resin; and from about 10 wt. % to about 50 wt. % of a low dielectric constant (Dk)/low dissipation factor (Df) glass fiber component, wherein the low Dk/low Df glass fiber component has a Dk of less than about 5.0 at a frequency of 1 MHz and a Df of less than about 0.002 at a frequency of 1 MHz.

Aspect 2: A thermoplastic composition comprising: from about 50 wt. % to about 90 wt. % of a polymeric base resin; and from about 10 wt. % to about 50 wt. % of a low dielectric constant (Dk)/low dissipation factor (Df) glass fiber component, wherein the low Dk/low Df glass fiber component has a Dk of less than about 5.0 at a frequency of from 1 MHz to 1 GHz to 1 GHz and a Df of less than about 0.002 at a frequency of from 1 MHz to 1 GHz to 1 GHz.

Aspect 3: A thermoplastic composition comprising: from about 50 wt. % to about 90 wt. % of a polymeric base resin; and from about 10 wt. % to about 50 wt. % of a low dielectric constant (Dk)/low dissipation factor (Df) glass fiber component, wherein the low Dk/low Df glass fiber component has a Dk of less than about 5.0 at a frequency of from 1 MHz to 1 GHz and a Df of less than about 0.002 at a frequency of from 1 MHz to 1 GHz.

Aspect 4: A thermoplastic composition comprising: from about 50 wt. % to about 90 wt. % of a polymeric base resin; and from about 10 wt. % to about 50 wt. % of a low dielectric constant (Dk)/low dissipation factor (Df) glass fiber component, wherein the low Dk/low Df glass fiber component has a Dk of less than about 5.0 at a frequency of from 1 MHz to 1 GHz and a Df of less than about 0.002 at a frequency of from 1 MHz to 1 GHz.

Aspect 5: The thermoplastic composition according to any one of Aspects 1-4, wherein the low Dk/low Df glass fiber component has a Df of less than about 0.001 at a frequency of from 1 MHz to 1 GHz.

Aspect 6: The thermoplastic composition according to any one of Aspects 1-5, wherein the composition further comprises up to 20 wt. % of an impact modifier.

Aspect 7: The thermoplastic composition according to Aspect 6, wherein the impact modifier is a styrene and ethylene/butylene (SEBS) copolymer, a polyester ether elastomer/ethylene-ethylacrylate copolymer, or a combination thereof.

Aspect 8: The thermoplastic composition according to any one of the previous Aspects, wherein the thermoplastic composition comprises a Dk that is at least about 0.1 lower than a substantially identical reference composition in the absence of a low Dk/low Df glass fiber component.

Aspect 9: The thermoplastic composition according to any one of the previous Aspects, wherein the thermoplastic composition comprises a Dk that is at least about 3% lower than a substantially identical reference composition in the absence of a low Dk/low Df glass fiber component.

Aspect 10: The thermoplastic composition according to any one of the previous Aspects, wherein the thermoplastic composition comprises a Dk that is about 3% to about 12% lower than a substantially identical reference composition in the absence of a low Dk/low Df glass fiber component.

Aspect 11: The thermoplastic composition according to any one of the previous Aspects, wherein the polymeric base resin comprises polypropylene, poly(p-phenylene oxide), polycarbonate, or a combination thereof and the thermoplastic composition comprises a Df that is at least about 5% lower than a substantially identical reference composition in the absence of a low Dk/low Df glass fiber component.

Aspect 12: The thermoplastic composition according to any one of Aspects 1 to 8, wherein the polymeric base resin comprises polypropylene, poly(p-phenylene oxide), or a combination thereof and the thermoplastic composition comprises a Df that is at least about 30% lower than a substantially identical reference composition in the absence of a low Dk/low Df glass fiber component.

Aspect 13: The thermoplastic composition according to any one of the previous Aspects, wherein the composition comprises from about 60 wt. % to about 80 wt. % of the polymeric base resin and from about 20 wt. % to about 30 wt. % of the low Dk/low Df glass fiber component.

Aspect 14: A method for making a thermoplastic article, comprising: forming a blend by mixing: from about 50 wt. % to about 90 wt. % of a polymeric base resin; and from about 10 wt. % to about 50 wt. % of a low dielectric constant (Dk)/low dissipation factor (Df) glass fiber component, wherein the low Dk/low Df glass fiber component has a Dk of less than about 5.0 at a frequency of from 1 MHz to 1 GHz and a Df of less than about 0.002 at a frequency of from 1 MHz to 1 GHz, and injection molding, extruding, rotational molding, blow molding or thermoforming the blend to form the thermoplastic article.

Aspect 15: A method for making a thermoplastic article, comprising: forming a blend by mixing: from about 50 wt. % to about 90 wt. % of a polymeric base resin; and from about 10 wt. % to about 50 wt. % of a low dielectric constant (Dk)/low dissipation factor (Df) glass fiber component, wherein the low Dk/low Df glass fiber component has a Dk of less than about 5.0 at a frequency of from 1 MHz to 1 GHz to 1 GHz and a Df of less than about 0.002 at a frequency of from 1 MHz to 1 GHz to 1 GHz, and injection molding, extruding, rotational molding, blow molding or thermoforming the blend to form the thermoplastic article.

Aspect 16: A method for making a thermoplastic article, consisting essentially of: forming a blend by mixing: from about 50 wt. % to about 90 wt. % of a polymeric base resin; and from about 10 wt. % to about 50 wt. % of a low dielectric constant (Dk)/low dissipation factor (Df) glass fiber component, wherein the low Dk/low Df glass fiber component has a Dk of less than about 5.0 at a frequency of from 1 MHz to 1 GHz and a Df of less than about 0.002 at a frequency of from 1 MHz to 1 GHz, and injection molding, extruding, rotational molding, blow molding or thermoforming the blend to form the thermoplastic article.

Aspect 17: A method for making a thermoplastic article, consisting of: forming a blend by mixing: from about 50 wt. % to about 90 wt. % of a polymeric base resin; and from about 10 wt. % to about 50 wt. % of a low dielectric constant (Dk)/low dissipation factor (Df) glass fiber component, wherein the low Dk/low Df glass fiber component has a Dk of less than about 5.0 at a frequency of from 1 MHz to 1 GHz and a Df of less than about 0.002 at a frequency of from 1 MHz to 1 GHz, and injection molding, extruding, rotational molding, blow molding or thermoforming the blend to form the thermoplastic article.

Aspect 18: The method according to any one of Aspects 15-17, wherein the thermoplastic article comprises an antenna or antenna component or a radio frequency component.

Aspect 19: The method according to any one of Aspects 15-18, wherein the low Dk/low Df glass fiber component has a Df of less than about 0.001 at a frequency of from 1 MHz to 1 GHz.

Aspect 20: The method according to any one of Aspects 15-19, wherein the blend further comprises up to 20 wt. % of an impact modifier.

Aspect 21: The method according to Aspect 20, wherein the impact modifier is a styrene and ethylene/butylene (SEBS) copolymer, a polyester ether elastomer/ethylene-ethylacrylate copolymer, or a combination thereof.

Aspect 22: The method according to any of Aspects 15-21, wherein the thermoplastic article comprises a Dk that is at least about 0.1 lower than a substantially identical reference article in the absence of a low Dk/low Df glass fiber component.

Aspect 23: The method according to any of Aspects 11 to 16, wherein the thermoplastic article comprises a Dk that is at least about 3% lower than a substantially identical reference article in the absence of a low Dk/low Df glass fiber component.

Aspect 24: The method according to any of Aspects 11 to 17, wherein the polymeric base resin comprises polypropylene, poly(p-phenylene oxide), polycarbonate, or a combination thereof and the thermoplastic article comprises a Df that is at least about 5% lower than a substantially identical reference article in the absence of a low Dk/low Df glass fiber component.

Aspect 25: The method according to any of Aspects 11 to 17, wherein the polymeric base resin comprises polypropylene, poly(p-phenylene oxide), or a combination thereof and the thermoplastic article comprises a Df that is at least about 30% lower than a substantially identical reference article in the absence of a low Dk/low Df glass fiber component.

Aspect 26: The method according to any of Aspects 11 to 19, wherein the blend comprises from about 60 wt. % to about 80 wt. % of the polymeric base resin and from about 20 wt. % to about 30 wt. % of the low Dk/low Df glass fiber component.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt. %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Thermoplastic compositions were developed using various polymers as the base resins, including polypropylene (PP), poly(p-phenylene oxide) (PPO), polycarbonate (PC), polybutylene terephthalate (PBT), and polyamide (PA). The typical developed formulations are shown and discussed below.

Table 3 lists the formulations of thermoplastic compositions according to aspects of the present disclosure including PP as the polymeric base resin. Examples E1.1 and E1.2 included a low Dk/low Df glass fiber component (the E-glass fiber ECS(HL)303, available from CPIC) and a styrene and ethylene/butylene (SEBS) copolymer (G1652, available from Kraton™) as an impact modifier. The control formulations, C1.1 and C1.2, were reinforced by a conventional glass fiber.

TABLE 3

Formulations of PP-based thermoplastic compositions

| Item Description | Unit | E1.1 | E1.2 | C1.1 | C1.2 |
|---|---|---|---|---|---|
| Homo polypropylene (PP) | % | 72 | 63 | 72 | 63 |
| G1652 SEBS copolymer | % | 8 | 7 | 8 | 7 |
| ECS(HL)303 E-glass fiber | % | 20 | 30 | | |
| Nittobo Glass fiber CHG3PA-830 | % | | | 20 | 30 |

Dielectric and physical performance of the PP compositions are listed in Table 4. As can be seen, the Dk and Df values of Examples E1.1 and E1.2 were much lower than their respective control compositions. For example, E1.2 had a Dk of less than 2.5 (2.49) at 1.1 GHz and a 30% glass fiber loading. Contrast this with C1.1, which had a higher Dk value at 1.1 GHz (2.51) but with only a 20% glass fiber loading, and then increased substantially to 2.67 when a direct comparison to a 30% glass fiber loading is made. Df of E1.1 and E1.2 was also substantially decreased compared to the control compositions.

Mechanical performance (e.g. modulus, notched Izod, CTE) of the compositions of Examples E1.1 and E1.2 was generally slightly worse than that of the comparative compositions, but is still acceptable. Density is presented as grams per cubic centimeter (g/cm³); melt (volume) flow rate (MVR), in cubic centimeters per 10 minutes (cm³/10 min); notched and unnotched Izod at 5 foot-pounds force (lbf/ft), in joules per meter (J/m); heat deflection temperature, in ° C.; flexural modulus, flexural strength, tensile modulus, and tensile strength in MPa; tensile elongation in a percent; and coefficient of liner thermal expansion (CTE), in ° C.

TABLE 4

Properties of PP-based thermoplastic compositions

| Property | Test Method | Test | Unit | E1.1 | E1.2 | C1.1 | C1.2 |
|---|---|---|---|---|---|---|---|
| Density | Specific Gravity | ASTM D792 | g/cm³ | 1.0247 | 1.097 | 1.0405 | 1.1077 |
| MVR | 280° C./ 2.16 kg | ASTM D1238 | cm³/ 10 min | 17.8 | 15.7 | 21 | 22.2 |
| Notched Izod | 23° C., 5 lbf/ft | ASTM D256 | J/m | 71 | 52 | 89 | 94 |
| Unnotched Izod | 23° C., 5 lbf/ft | ASTM D256 | J/m | 298 | 240 | 237 | 189 |
| HDT | 0.45 MPa/ 3.2 mm | ASTM D648 | ° C. | 139 | 137 | 138 | 142 |
| Flexural Modulus | 3.2 mm, 1.27 mm/min | ASTM D790 | MPa | 3110 | 4520 | 3640 | 5330 |
| Flexural Strength | at break, 3.2 mm, 1.27 mm/min | ASTM D790 | MPa | 80 | 69 | 67 | 64.5 |
| Tensile Modulus | 5 mm/min | ASTM D638 | MPa | 3557 | 4882 | 4495 | 5932 |
| Tensile Strength | at break, 5 mm/min | ASTM D638 | MPa | 59 | 52 | 32 | 45 |
| Tensile | at break, | ASTM | % | 2.61 | 1.59 | 1.69 | 1.2 |

TABLE 4-continued

Properties of PP-based thermoplastic compositions

| Property | Test Method | Test | Unit | E1.1 | E1.2 | C1.1 | C1.2 |
|---|---|---|---|---|---|---|---|
| Elongation | 5 mm/min | D638 | | | | | |
| CTE | flow, −30~80° C. | ASTM E831 | 1E−05/° C. | 2.91 | 2.43 | 2.36 | 1.83 |
| | xflow, −30~80° C. | ASTM E831 | 1E−05/° C. | 12.45 | 12.13 | 11.37 | 10.83 |
| Dk | 1.1 GHz | SABIC Method | — | 2.36 | 2.49 | 2.51 | 2.67 |
| Df | 1.1 GHz | SABIC Method | — | 7.6e−4 | 1.19e−3 | 1.58e−3 | 2.32e−3 |
| Dk | 1.9 GHz | SABIC Method | — | 2.39 | 2.51 | 2.53 | 2.7 |
| Df | 1.9 GHz | SABIC Method | — | 8.3e−4 | 1.19e−3 | 1.71e−3 | 2.5e−3 |

As described above and below, the "SABIC Method" for determining Dk and Df includes measuring these values using a QWED split post dielectric resonator and an Agilent network analyzer. For the 1.1 GHz measurement, the minimum sample size is 120 mm*120 mm; the maximum sample thickness is 6 mm. For the 1.9 GHz measurement, the minimum sample size is 70 mm*70 mm; the maximum sample thickness is 4 mm. The test samples were prepared according to an injection molding process (as described above), and had a size of 150 mm*150 mm*3.0 mm in accordance with the above specifications.

Thermoplastic compositions according to aspects of the present disclosure including PPO and PP as the polymeric base resin are listed in Table 5. Examples E2.1, E2.2 and E2.3 included a low Dk/low Df glass fiber component (the E-glass fiber ECS(HL)303, available from CPIC) and a styrene and ethylene/butylene (SEBS) copolymer impact modifier (G1652, available from Kraton™ or Tuftec™ H1043, available from Asahi Kasei). The control formulations, C2.1, C2.2 and C2.3, were reinforced by a conventional glass fiber used in PPO-based (Noryl™) resins.

Dielectric and physical performance of the PPO/PP-based thermoplastic compositions are listed in Table 6. As shown, the Dk and Df results of Examples E2.1, E2.2 and E2.3 were all much lower than their respective control compositions C2.1, C2.2 and C2.3. The impact modifier (SEBS copolymer) was included to improve the ductility of the compositions. The PP copolymer was included with the base resin to increase processability and ductility.

As with the PP-based compositions, the mechanical properties of the PPO/PP-based thermoplastic compositions were comparable or slightly lower than the control compositions. Thus, low Dk/low Df thermoplastic compositions could be formed from PPO/PP-based resins according to aspects of the disclosure with satisfactory mechanical performance.

TABLE 5

Formulations of PPO/PP-based thermoplastic compositions

| Item Description | Unit | E2.1 | E2.2 | E2.3 | C2.1 | C2.2 | C2.3 |
|---|---|---|---|---|---|---|---|
| PPO (.40 deciliters per gram (dl/g) intrinsic viscosity (IV) or .46IV) | % | 26.7 | 21.7 | 21.7 | 26.7 | 21.7 | 21.7 |
| Homo polypropylene (PP) | % | 43 | 50 | 0 | 43 | 50 | 0 |
| SABIC PP block copolymer | % | 0 | 0 | 50 | 0 | 0 | 50 |
| ECS(HL)303 E-glass fiber | % | 20 | 20 | 20 | 0 | 0 | 0 |
| CPIC Glass fiber for Noryl | % | 0 | 0 | 0 | 20 | 20 | 20 |
| Tuftec ™ H1043 SEBS copolymer | % | 10 | 0 | 0 | 10 | 0 | 0 |
| G1652 SEBS copolymer | % | 0 | 8 | 8 | | 8 | 8 |
| Magnesium Oxide | % | 0.05 | 0.05 | 0.05 | 0.05 | 0.05 | 0.05 |
| Zinc Sulfide | % | 0.05 | 0.05 | 0.05 | 0.05 | 0.05 | 0.05 |
| Triisodecyl phosphite (TDP) anti-oxidant | % | 0.2 | 0.2 | 0.2 | 0.2 | 0.2 | 0.2 |

TABLE 6

Properties of PPO/PP-based thermoplastic compositions

| Property | Test Method | Unit | E2.1 | E2.2 | E2.3 | C2.1 | C2.2 | C2.3 |
|---|---|---|---|---|---|---|---|---|
| Density | Specific Gravity | g/cm$^3$ | 1.090 | 1.064 | 1.064 | 1.106 | 1.085 | 1.082 |
| MVR | 280° C./5 kg/ 360 s | cm$^3$/10 min | 14.4 | 23.9 | 14.2 | 16.9 | 27.2 | 15 |
| Notched Izod | 23° C., 5 lbf/ft | J/m | 90 | 134 | 129 | 87 | 126 | 177 |
| Ductility | 23° C., 5 lbf/ft | % | 0 | 100 | 100 | 0 | 100 | 100 |
| Unnotched Izod | 23° C., 5 lbf/ft | J/m | 734 | 797 | 700 | 666 | 766 | 801 |
| HDT | 0.45 MPa/ 3.2 mm | ° C. | 160 | 146 | 134 | 161 | 145 | 136 |
| Flexural Modulus | 3.2 mm, 1.27 mm/min | MPa | 4150 | 2900 | 2240 | 4550 | 2920 | 2370 |
| Flexural Strength | break, 3.2 mm, 1.27 mm/min | MPa | 127 | 94 | 50 | 126 | 90 | 44 |
| Tensile Modulus | 5 mm/min | MPa | 4917 | 3208 | 2719 | 5336 | 3486 | 2732 |
| Tensile Strength | @break, 5 mm/min | MPa | 83 | 63 | 33.4 | 78 | 57 | 29 |
| Tensile Elongation | @break, 5 mm/min | % | 3.62 | 4.26 | 2.89 | 3.37 | 4.63 | 2.98 |
| CTE | flow, −30~80° C. | 1E−05/° C. | 2.65 | 3.34 | 2.4 | 2.78 | 2.58 | 2.59 |
|  | xflow, −30~80° C. | 1E−05/° C. | 9.83 | 11.66 | 12.38 | 10.47 | 10.35 | 12.09 |
| Dk | 1.1 GHz | — | 2.51 | 2.49 | 2.46 | 2.61 | 2.58 | 2.58 |
| Df | 1.1 GHz | — | 1e−3 | 9.6e−4 | 1e−3 | 1.5e−3 | 1.4e−3 | 1.5e−3 |
| Dk | 1.9 GHz | — | 2.52 | 2.50 | 2.50 | 2.63 | 2.59 | 2.61 |
| Df | 1.9 GHz | — | 1.1e−3 | 1.07e−3 | 1.1e−3 | 1.7e−3 | 1.56e−3 | 1.6e−3 |

Density was tested per ASTM D792.
MVR was tested per ASTM D1238.
Notched Izod, Ductility, and Unnotched Izod were tested per ASTM D256.
HDT was tested per ASTM D648.
Flexural Modulus and Flexural Strength were tested per ASTM D790.
Tensile Modulus, Tensile Strength, and Tensile Elongation were tested per ASTM D638.
CTE was tested per ASTM E831.
Dk, Df were tested per SABIC Method.

A PC-based thermoplastic composition according to an aspect of the present disclosure is listed in Table 7. Example 3.1 and Controls C3.1, C3.2 and C3.3 included a blend of polycarbonate polymers. Example 3.1 included a low Dk/low Df glass fiber component (the E-glass fiber ECS (HL)303). The control samples included glass fibers that are commonly applied in PC-based products.

TABLE 7

Formulations of PC-based thermoplastic compositions

| Item Description | Unit | E3.1 | C3.1 | C3.2 | C3.3 |
|---|---|---|---|---|---|
| PCP 1300 (polycarbonate) | % | 40 | 40 | 40 | 40 |
| 100 GRADE PCP (polycarbonate) | % | 39.3 | 39.3 | 39.3 | 39.3 |
| ECS(HL)303 E-glass fiber | % | 20 |  |  |  |
| Nittobo glass fiber CHG3PA-830 | % |  | 20 |  |  |
| Nittobo flat glass fiber | % |  |  | 20 |  |
| CPIC ECS-307 for use in Lexan | % |  |  |  | 20 |
| Hindered phenol stabilizer | % | 0.1 | 0.1 | 0.1 | 0.1 |
| Phosphite Stabilizer | % | 0.1 | 0.1 | 0.1 | 0.1 |
| Mold release | % | 0.5 | 0.5 | 0.5 | 0.5 |

Dielectric and physical performance of the PC-based thermoplastic composition is listed in Table 8. The Dk and Df values of the composition of Example E3.1 were substantially lower than those of the control compositions. In particular, the Dk values of Example E3.1 were lower by more than 0.1 than those of control compositions. Thermal and mechanical performance of Example E3.1 was comparable to that of the control compositions.

TABLE 8

Properties of PC-based thermoplastic compositions

| Property | Test Method | Test Description | Unit | E3.1 | C3.1 | C3.2 | C3.3 |
|---|---|---|---|---|---|---|---|
| Density | Specific Gravity | ASTM D792 | g/cm$^3$ | 1.325 | 1.336 | 1.336 | 1.337 |

TABLE 8-continued

Properties of PC-based thermoplastic compositions

| Property | Test Method | Test Description | Unit | E3.1 | C3.1 | C3.2 | C3.3 |
|---|---|---|---|---|---|---|---|
| MVR | 300° C./2.16 kg | ASTM D1238 | $cm^3$/10 min | 10.7 | 13.2 | 14.5 | 16.8 |
| Notched Izod | 23° C., 5 lbf/ft | ASTM D256 | J/m | 129 | 124 | 125 | 103 |
| Unnotched Izod | 23° C., 5 lbf/ft | ASTM D256 | J/m | 863 | 737 | 778 | 752 |
| HDT | 1.82 MPa/3.2 mm | ASTM D648 | ° C. | 139 | 139 | 138 | 138 |
| Flexural Modulus | 3.2 mm, 1.27 mm/min | ASTM D790 | MPa | 5470 | 6340 | 5950 | 5670 |
| Flexural Strength | @break, 3.2 mm, 1.27 mm/min | ASTM D790 | MPa | 164 | 167 | 162 | 154 |
| Tensile Modulus | 5 mm/min | ASTM D638 | MPa | 5469 | 6382 | 6002 | 5763 |
| Tensile Strength | @break, 5 mm/min | ASTM D638 | MPa | 109 | 105 | 101 | 97 |
| Tensile Elongation | @break, 5 mm/min | ASTM D638 | % | 3.49 | 3.1 | 3.24 | 3.18 |
| CTE | flow, −30~80° C. | ASTM E831 | 1E−05/° C. | 3.14 | 2.82 | 2.95 | 3.21 |
|  | xflow, −30~80° C. | ASTM E831 | 1E−05/° C. | 8.41 | 7.99 | 7.85 | 8.41 |
| Dk | 1.1 GHz | SABIC Method | — | 2.97 | 3.11 | 3.13 | 3.10 |
| Df | 1.1 GHz | SABIC Method | — | 5.5e−3 | 6.3e−3 | 6.0e−3 | 5.9e−3 |
| Dk | 1.9 GHz | SABIC Method | — | 2.97 | 3.13 | 3.14 | 3.12 |
| Df | 1.9 GHz | SABIC Method | — | 5.2e−3 | 6.0e−3 | 5.7e−3 | 5.6e−3 |

A PBT/PET-based thermoplastic composition according to an aspect of the present disclosure is listed in Table 9. Example E4.1 and control C4.1 included a blend of PBT and PET. Example E4.1 included a low Dk/low Df glass fiber component (the E-glass fiber ECS(HL)303). Control sample C4.1 included a 'flat' E-glass fiber as the reinforcing agent. The impact modifier in this example was a was a mixture of polyester elastomers, including butylene phthalate-poly (alkylene ether) phthalate copolymer, acrylic acid ethyl ester-ethylene copolymer, and ethylene-methyl acrylate-glycidylmethacrylate terpolymer (i.e., a combination of Hytrel™ 4056, Amplify™ EA 102, and Lotader™ AX 8900).

TABLE 9

Formulations of PBT/PET-based thermoplastic compositions

| Item Description | Unit | E4.1 | C4.1 |
|---|---|---|---|
| PBT, 1200-211D | % | 42 | 42 |
| High IV PET | % | 20 | 20 |
| ECS(HL)303 E-glass fiber | % | 30 |  |
| E-glass fiber, 'flat' cross section | % |  | 30 |
| Hindered phenol stabilizer | % | 0.1 | 0.1 |
| 2-(2'hydroxy-5-t-octylphenyl)-benzotriazole | % | 0.25 | 0.25 |
| Mono zinc phosphate | % | 0.15 | 0.15 |
| Butylene phthalate-poly(alkylene ether) phthalate copolymer (Hytrel ™ 4056) | % | 2.5 | 2.5 |
| Acrylic acid ethyl ester-ethylene copolymer (Amplify ™ EA 102) | % | 2 | 2 |
| Ethylene-methyl acrylate-glycidylmethacrylate terpolymer (Lotader ™ AX 8900) | % | 3 | 3 |

Dielectric and physical performance of the PBT/PET-based thermoplastic composition is listed in Table 10. The Dk and Df values of the composition of Example E4.1 were substantially lower than that of the control composition C4.1. In particular, the Dk values of Example E4.1 were lower by more than 0.3 than those of control composition C4.1. Thermal and mechanical performance of Example E4.1 was comparable to that of the control composition C4.1.

TABLE 10

Properties of PBT/PET-based thermoplastic compositions

| Typical Property | Test Method | Test Description | Unit | E4.1 | C4.1 |
|---|---|---|---|---|---|
| MVR | 270° C./5 kg | ASTM D1238 | $cm^3$/10 min | 25.5 | 34.9 |
| Notched Izod | 23° C., 5 lbf/ft | ASTM D256 | J/m | 124 | 125 |

TABLE 10-continued

Properties of PBT/PET-based thermoplastic compositions

| Typical Property | Test Method | Test Description | Unit | E4.1 | C4.1 |
|---|---|---|---|---|---|
| HDT | 1.82 MPa/3.2 mm | ASTM D648 | °C. | 208 | 209 |
| Flexural Modulus | 3.2 mm, 1.27 mm/min | ASTM D790 | MPa | 6720 | 6730 |
| Flexural Strength | at break, 3.2 mm, 1.27 mm/min | ASTM D790 | MPa | 165 | 168 |
| Tensile Modulus | 5 mm/min | ASTM D638 | MPa | 7525 | 8530 |
| Tensile Strength | at break, 5 mm/min | ASTM D638 | MPa | 104 | 108 |
| Tensile Elongation | at break, 5 mm/min | ASTM D638 | % | 2.73 | 2.36 |
| Shrinkage | parallel | ASTM D955 | % | 0.2 | 0.26 |
|  | perpendicular | ASTM D955 | % | 0.67 | 0.5 |
| Dk | 1.1 GHz | SABIC Method | — | 3.21 | 3.55 |
| Df | 1.1 GHz | SABIC Method | — | 0.012 | 0.013 |
| Dk | 1.9 GHz | SABIC Method | — | 3.22 | 3.55 |
| Df | 1.9 GHz | SABIC Method | — | 0.011 | 0.012 |

A PA-based thermoplastic composition according to an aspect of the disclosure is shown in Table 11. Example E5.1 and control C5.1 included Nylon 9T, available from Kuraray Co. Example 5.1 included and a low Dk/low Df glass fiber component (the E-glass fiber CS(HL)301HP). Control sample C5.1 included a flat glass fiber available from Nittobo.

TABLE 11

Formulations of PA-based thermoplastic compositions

| Item Description | Unit | E5.1 | C5.1 |
|---|---|---|---|
| PA9T (Polyamide - PA) | % | 79.7 | 79.7 |
| CS(HL)301HP E-glass fiber | % | 20 |  |
| Flat glass fiber CSG3PA820 | % |  | 20 |
| Phenolic prim antioxidant for PA | % | 0.15 | 0.15 |
| Phosphite stabilizer | % | 0.15 | 0.15 |

Dielectric and physical performance of the PA-based thermoplastic composition is listed in Table 12. The Dk values of the composition of Example E5.1 were substantially lower, by more than 0.1, than those of the control composition C5.1. Thermal and mechanical performance of the composition of Example E5.1 was comparable to that of the control composition C5.1.

TABLE 12

Properties of PA-based thermoplastic compositions

| Property | Test Method | Test Description | Unit | E5.1 | C5.1 |
|---|---|---|---|---|---|
| density | Specific Gravity | ASTM D792 | g/cm$^3$ | 1.26 | 1.274 |
| MVR | 310° C./1.2 kg | ASTM D1238 | cm$^3$/10 min | 44.8 | 48.9 |
| Notched Izod | 23° C., 5 lbf/ft | ASTM D256 | J/m | 70 | 59 |
| Unnotched Izod | 23° C., 5 lbf/ft | ASTM D256 | J/m | 270 | 196 |
| HDT | 1.82 MPa/3.2 mm | ASTM D648 | °C. | 269 | 265 |
|  | 0.45 MPa/3.2 mm | ASTM D648 | °C. | 280 | 280 |
| Flexural Modulus | 3.2 mm, 1.27 mm/min | ASTM D790 | MPa | 5790 | 6200 |
| Flexural Strength | @break, 3.2 mm, 1.27 mm/min | ASTM D790 | MPa | 150 | 134 |
| Tensile Modulus | 5 mm/min | ASTM D638 | MPa | 5515 | 6158 |
| Tensile Strength | @break, 5 mm/min | ASTM D638 | MPa | 81 | 82 |
| Tensile Elongation | @break, 5 mm/min | ASTM D638 | % | 1.45 | 1.35 |
| CTE | flow, −30~80° C. | ASTM E831 | 1E−05/°C. | 3.03 | 2.88 |
|  | xflow, −30~80° C. | ASTM E831 | 1E−05/°C. | 7.35 | 6.99 |
| Dk | 1.1 GHz | SABIC Method | — | 3.13 | 3.25 |
| Df | 1.1 GHz | SABIC Method | — | 0.011 | 0.010 |

TABLE 12-continued

Properties of PA-based thermoplastic compositions

| Property | Test Method | Test Description | Unit | E5.1 | C5.1 |
|---|---|---|---|---|---|
| Dk | 1.9 GHz | SABIC Method | — | 3.15 | 3.30 |
| Df | 1.9 GHz | SABIC Method | — | 0.010 | 0.010 |

A syndiotactic polystyrene-based thermoplastic composition according to an aspect of the disclosure is shown in Table 13. Example E6.1 and control C6.1 included Nylon 9T, available from Kuraray Co. Example 6.1 included and a low Dk/low Df glass fiber component (the E-glass fiber CS(HL)301HP). Control sample C6.1 included a flat glass fiber available from Nittobo.

TABLE 13

Formulation of sPS (syndiotactic polystrene) based low Dk, low Df compositions

| Item Code | Item Description | Unit | E6.1 | C6.1 |
|---|---|---|---|---|
| XR130/B | Polystyrene | % | 70 | 70 |
| G303 | CPIC low Dk/Df Glass fiber | % | 30 | |
| NCA2 | CPIC round glass for Noryl | % | | 30 |

As shown in Table 14, the composition using low Dk/Df glass fiber had a lower Dk and Df than the control sample. The Dk @ 1.9 Hz dropped from 3.0 to 2.8 and Df dropped from 0.0022 to 0.0016. The other properties of the compositions were similar. It is also noted that although sPS naturally has lower Dk and Df compared to different plastics in this category, dielectric performance can be further improved with the use of a low Dk/Df glass fiber, which could be useful in certain challenging applications.

TABLE 14

Properties of sPS (syndiotactic polystrene) based low Dk, low Df compositions

| Typical Property | Test Method | Test Description | Unit | E6.1 | C6.1 |
|---|---|---|---|---|---|
| MVR | 300° C./2.16 kg | ASTM D1238 | cm³/10 min | 5.3 | 12.9 |
| Notched IZOD | 23° C., 5 lbf/ft | ASTM D256 | J/m | 57 | 59 |
| Unnotched IZOD | 23° C., 5 lbf/ft | ASTM D256 | J/m | 135 | 150 |
| HDT | 1.82 MPa/3.2 mm | ASTM D648 | ° C. | 117 | 115 |
| Flexural Modulus | 3.2 mm, 1.27 mm/min | ASTM D790 | MPa | 8800 | 9320 |
| Flexural Strength | @break, 3.2 mm, 1.27 mm/min | ASTM D790 | MPa | 126 | 131 |
| Tensile Modulus | 5 mm/min | ASTM D638 | MPa | 8987 | 9724 |
| Tensile Strength | @break, 5 mm/min | ASTM D638 | MPa | 84.5 | 91.5 |
| Tensile Elongation | @break, 5 mm/min | ASTM D638 | % | 1.1 | 1.1 |
| Dk | 1.9 GHz | SABIC Method | / | 2.8 | 3.0 |
| Df | 1.9 GHz | SABIC Method | / | 0.0016 | 0.0022 |

Formulations for a polyetherimide based low Dk/Df compositions are shown in Table 15. The developed composition and control sample are listed in E7.1 and C7.1, respectively, and test results are shown in Table 15. Glass fiber in an amount of 15 wt. % was used in both control and developed composition.

TABLE 15

Formulation of PEI (polyetherimide) based low Dk, low Df compositions

| Item Code | Item Description | Unit | C7.1 | E7.1 |
|---|---|---|---|---|
| C150 | Ultem 1010 | % | 84.8 | 84.8 |
| G303 | CPIC low Dk/Df Glass fiber | % | | 15 |
| G1170-10P | 910A | % | 15 | |
| F174 | HINDERED PHENOL STABILIZER | % | 0.1 | 0.1 |
| F542 | Phosphite stabilizer | % | 0.1 | 0.1 |

Table 16 presents the properties of the polyetherimide based compositions. It was apparent that low Dk/Df glass fiber contributes to improve the dielectric performance as reflected by the drop of Dk from 3.29 to 3.13 and Df drop from 0.0029 to 0.0019.

TABLE 16

Properties of PEI (polyetherimide) based low Dk, low Df compositions

| Typical Property | Test Method | Test Description | Unit | C7.1 | E7.1 |
|---|---|---|---|---|---|
| MVR | 360° C./2.16 kg | ASTM D1238 | $cm^3$/10 min | 8 | 6.78 |
| Notched IZOD | 23° C., 5 lbf/ft | ASTM D256 | J/m | 53 | 47 |
| Flexural Modulus | 3.2 mm, 1.27 mm/min | ASTM D790 | MPa | 5840 | 5540 |
| Flexural Strength | @break, 3.2 mm, 1.27 mm/min | ASTM D790 | MPa | 221 | 194 |
| Tensile Modulus | 5 mm/min | ASTM D638 | MPa | 6299 | 5997 |
| Tensile Strength | @break, 5 mm/min | ASTM D638 | MPa | 153.3 | 138.6 |
| Tensile Elongation | @break, 5 mm/min | ASTM D638 | % | 4.3 | 3.5 |
| Dk | 1.9 GHz | SABIC Method | / | 3.29 | 3.13 |
| Df | 1.9 GHz | SABIC Method | / | 0.00291 | 0.0019 |

Formulations for a polyphenylene based low Dk/Df compositions are shown in Table 17. The developed composition and control sample are listed in E8.1 and C8.1, respectively. Glass fiber in an amount of 15 wt. % was used in both control and developed composition.

TABLE 17

Formulation of PPS (polyphenylene sulfide) based low Dk, low Df compositions

| Item Code | Item Description | Unit | C8.1 | E8.1 |
|---|---|---|---|---|
| 127727 | PPS Kureha Fortron W-214A | % | 84.8 | 84.8 |
| G303 | CPIC low Dk/Df Glass fiber | % | | 15 |
| G1170-10P | 910A | % | 15 | |
| F538 | Mold release | | 0.5 | 0.5 |

Table 18 presents the properties of PPS based low Dk/Df compositions. It shows similar result that dielectric performance has been improved (compare 3.42 to 3.34 for Dk and 0.00318 to 0.00292 for Df), while the performance with respect to mechanical properties have been maintained.

TABLE 18

Properties of PPS (polyphenylene sulfide) based low Dk, low Df compositions

| Typical Property | Test Method | Test Description | Unit | C8.1 | E8.1 |
|---|---|---|---|---|---|
| MVR | 330° C./2.16 kg | ASTM D1238 | $cm^3$/10 min | 54 | 49 |
| Notched IZOD | 23° C., 5 lbf/ft | ASTM D256 | J/m | 50.3 | 64.3 |
| Flexural Modulus | 3.2 mm, 1.27 mm/min | ASTM D790 | MPa | 6310 | 5990 |
| Flexural Strength | @break, 3.2 mm, 1.27 mm/min | ASTM D790 | MPa | 171 | 165 |
| Tensile Modulus | 5 mm/min | ASTM D638 | MPa | 6785 | 6416 |
| Tensile Strength | @break, 5 mm/min | ASTM D638 | MPa | 114.6 | 109.9 |
| Tensile Elongation | @break, 5 mm/min | ASTM D638 | % | 2.2 | 2.2 |
| Dk | 1.9 GHz | SABIC Method | / | 3.42 | 3.34 |
| Df | 1.9 GHz | SABIC Method | / | 0.00318 | 0.00292 |

Based on the above examples it is evident that thermoplastic compositions according to aspects of the present disclosure have been achieved that have substantially improved dielectric properties (e.g., Dk and Df) and that maintain mechanical performance and processing properties.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination That which is claimed is:

1. A thermoplastic composition comprising:
   from about 50 wt. % to about 90 wt. % of a polymeric base resin comprising a polypropylene, a poly(p-phenylene oxide), a polycarbonate, a polyetherimide, a polystyrene, a polyphenylene sulfide, or a combination thereof; and
   from about 10 wt. % to about 50 wt. % of a low dielectric constant (Dk)/low dissipation factor (DO glass fiber component,
   wherein the low Dk/low Df glass fiber component has a Dk of 4.6 or less at a frequency of about 1 MHz to 1 GHz and a Df of less than about 0.001 at a frequency of from 1 MHz to 1 GHz, and wherein the thermoplastic composition further comprises 0.01 to 20 wt. % of an impact modifier.

2. The thermoplastic composition according to claim 1, wherein the impact modifier is a styrene and ethylene/butylene (SEBS) copolymer, a polyester ether elastomer/ethylene-ethylacrylate copolymer, or a combination thereof.

3. The thermoplastic composition according to claim 1, wherein the thermoplastic composition comprises a Dk that is at least 0.1 lower than a substantially identical reference composition in the absence of a low Dk/low Df glass fiber component.

4. The thermoplastic composition according to claim 1, wherein the thermoplastic composition comprises a Dk that is at least about 3% lower than a substantially identical reference composition in the absence of a low Dk/low Df glass fiber component.

5. The thermoplastic composition according to claim 1, wherein the thermoplastic composition comprises a Dk that is about 3% to about 12% lower than a substantially identical reference composition in the absence of a low Dk/low Df glass fiber component.

6. The thermoplastic composition according to claim 1, wherein the thermoplastic composition comprises a Df that is at least about 5% lower than a substantially identical reference composition in the absence of a low Dk/low Df glass fiber component.

7. The thermoplastic composition according to claim 1, wherein the polymeric base resin comprises polypropylene, poly(p-phenylene oxide), or a combination thereof and the thermoplastic composition comprises a Df that is at least about 30% lower than a substantially identical reference composition in the absence of a low Dk/low Df glass fiber component.

8. The thermoplastic composition according to claim 1, wherein the composition comprises from about 60 wt. % to about 80 wt. % of the polymeric base resin and from about 20 wt. % to about 30 wt. % of the low Dk/low Df glass fiber component.

9. A method for making a thermoplastic article, comprising: forming a blend by mixing:
   from about 50 wt.% to about 90 wt. % of a polymeric base resin comprising a polypropylene, a poly(p-phenylene oxide), a polycarbonate, a polyetherimide, a polystyrene, a polyphenylene sulfide, or a combination thereof; and
   from about 10 wt. % to about 50 wt. % of a low dielectric constant (Dk)/low dissipation factor (Df) glass fiber component, wherein the low Dk/low Df glass fiber component has a Dk of less than about 4.6 at a frequency of from 1 MHz to 1 GHz and a Df of less than about 0.001 at a frequency of from 1 MHz to 1 GHz, and 0.01 wt. % to 20 wt. % of an impact modifier, and
   injection molding, extruding, rotational molding, blow molding or thermoforming the blend to form the thermoplastic article.

10. The method according to claim 9, wherein the thermoplastic article comprises an antenna or antenna component or a radio frequency component.

11. The method according to claim 9, wherein the impact modifier is a styrene and ethylene/butylene (SEBS) copolymer, a polyester ether elastomer/ethylene-ethylacrylate copolymer, or a combination thereof.

12. The method according to claim 9, wherein the thermoplastic article comprises a Dk that is at least about 0.1 lower than a substantially identical reference article in the absence of a low Dk/low Df glass fiber component.

13. The method according to claim 9, wherein the thermoplastic article comprises a Dk that is at least about 3% lower than a substantially identical reference article in the absence of a low Dk/low Df glass fiber component.

14. The method according to claim 9, wherein the polymeric base resin comprises polypropylene, poly(p-phenylene oxide), polycarbonate, or a combination thereof and the thermoplastic article comprises a Df that is at least about 5% lower than a substantially identical reference article in the absence of a low Dk/low Df glass fiber component.

15. The method according to claim 9, wherein the polymeric base resin comprises polypropylene, poly(p-phenylene oxide), or a combination thereof and the thermoplastic article comprises a Df that is at least about 30% lower than a substantially identical reference article in the absence of a low Dk/low Df glass fiber component.

16. The method according to claim 9, wherein the blend comprises from about 60 wt. % to about 80 wt. % of the polymeric base resin and from about 20 wt. % to about 30 wt. % of the low Dk/low Df glass fiber component.

* * * * *